United States Patent [19]

Latall

[11] 3,740,785
[45] June 26, 1973

[54] HYDRAULIC SEWER PIPELINE CLEANER
[75] Inventor: Roy C. Latall, Des Plaines, Ill.
[73] Assignee: O'Brien Manufacturing Company, Inc., Chicago, Ill.
[22] Filed: July 14, 1971
[21] Appl. No.: 190,314

Related U.S. Application Data
[63] Continuation of Ser. No. 40,275, May 25, 1970, abandoned.

[52] U.S. Cl. .......................................... 15/104.12
[51] Int. Cl. ............................................ B08b 9/02
[58] Field of Search ................ 15/104.05, 104.09, 15/104.12, 104.3; 418/171; 417/310

[56] References Cited
UNITED STATES PATENTS
| | | | |
|---|---|---|---|
| 3,120,814 | 2/1964 | Mueller | 417/310 |
| 3,129,875 | 4/1964 | Cirillo | 418/171 |
| 3,432,872 | 3/1969 | Kirschke | 15/104.12 |
| 3,449,783 | 6/1969 | Kirschke | 15/104.12 |
| 3,525,112 | 8/1970 | Masters | 15/104.12 |

Primary Examiner—Edward L. Roberts
Attorney—Hofgrens, Wegner, Allen, Stellman & McCord

[57] ABSTRACT

A skid-mounted, jet-propelled, hydraulic, pipeline cleaner which is activated from a stationary high pressure water pumping unit to which it is connected by a flexible hose. A novel skid arrangement of extreme rigidity, a selectively positionable water jet capable of assuming either a propelling position or a tool flushing position, and a jet propulsion system which is so designed that the jets produced thereby discharge directly into the pipeline void and do not impinge against any portion of the pipeline cleaner as a whole so that no retarding influence is offered to the free forward motion of the cleaner, constitute the salient features of the invention.

9 Claims, 5 Drawing Figures

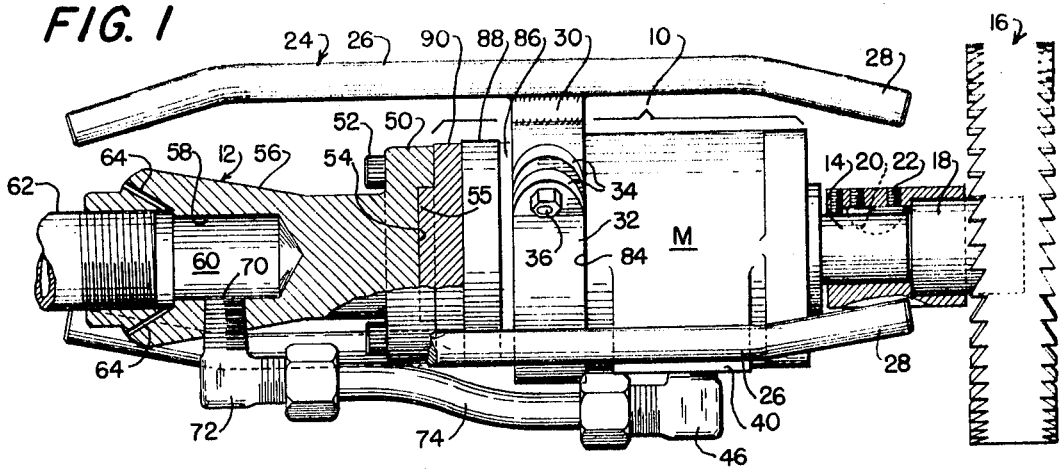
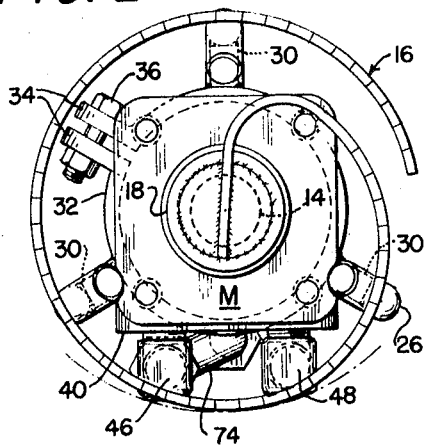
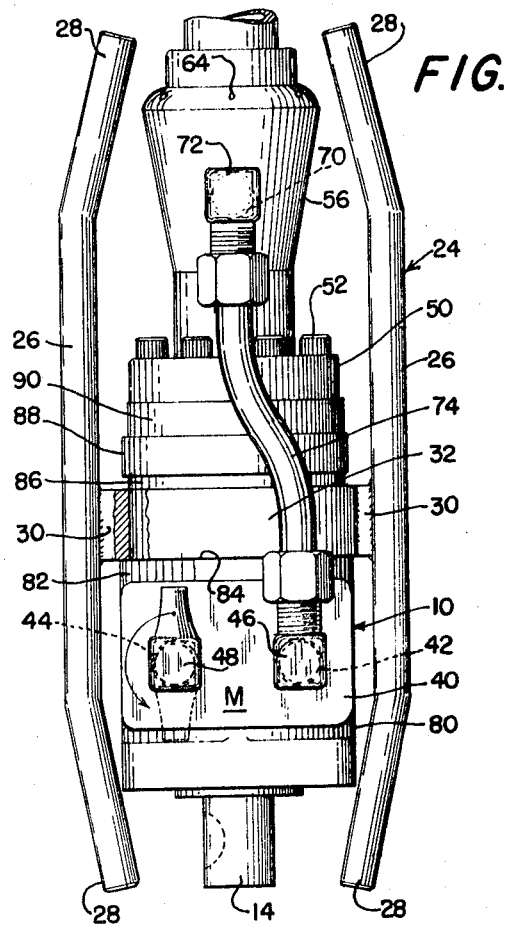
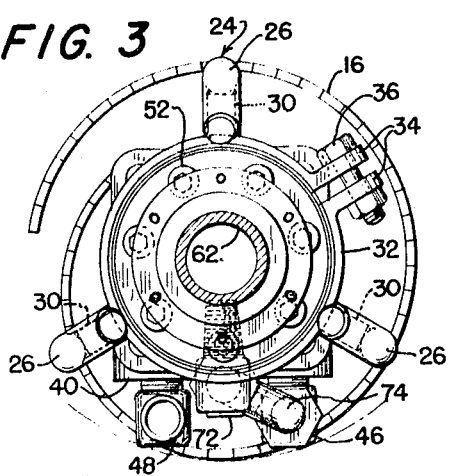
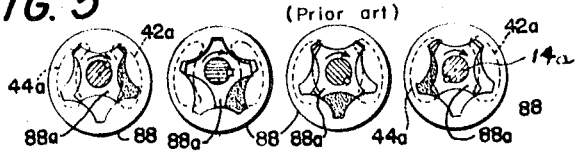

HYDRAULIC SEWER PIPELINE CLEANER

This is a continuation of application Ser. No. 4,0275, filed May 25, 1970, and now abandoned.

The improved skid-mounted, jet-propelled, hydraulic pipeline cleaner comprising the present invention is designed for use primarily in connection with the cleaning and flushing of a sewer pipeline where there is likely to be an accumulation of roots and other live or inanimate matter. The invention is, however, capable of other uses and a pipeline cleaner embodying the principles of the present invention may, if desired and with or without modification as required, be employed for cleaning all manner of pipelines such, for example, as an oil pipeline wherein the removal of paraffin deposits is important.

The pipeline cleaner of the present invention is adapted for use in conjunction with a truck or trailer having a water tank and a pump capable of delivering water under a pressure of approximately 1,000 psi, the pump being driven by a suitable vehicle-mounted engine and, in addition, being operatively connected to a reel-mounted high pressure hose which has the cleaner attached to its discharge end and embodies sufficient tensile strength that it may be retracted from the pipeline being cleaned by the cleaner against the pull of the propulsion jets of the cleaner in order to flush the material which is loosened in the pipeline during forward travel of the cleaner in the pipeline. The invention is not limited to such portable use and, if desired, the pipeline cleaner may derive its jet propulsion and flushing effect from a water hydrant. Irrespective, however, of the particular use to which the invention may be put, or of the source of its water or other fluid supply, the essential features of the invention remain unaltered.

Briefly, the present invention contemplates the provision of a pipeline cleaner embodying a composite casing including a front motor section and a rear jet thrust section, the two sections being bolted together. The rear jet thrust section is provided with an internal pressure chamber which is connected to the discharge end of the associated high pressure hose and feeds water under pressure to a series of high pressure jet orifices, the latter being directed rearwardly and occupying positions at the extreme rear end of the cleaner so that the forward thrust that is developed thereby is clear with no retarding influence being offered to their propelling action. The front motor section of the composite casing of the cleaner embodies a conventional hydraulic motor and is provided with a fluid inlet and a fluid outlet. The internal pressure chamber in the rear jet thrust section of the casing is provided with a motor feed outlet which is connected to the motor inlet by a short length of tubing. The latter constitutes a motor feed line, while the fluid outlet of the motor is provided with an elbow-like fitting which constitutes an auxiliary low pressure jet nozzle. The elbow-like fitting, when turned so as to direct its water jet rearwards, augments to a certain degree the jet action of the aforementioned high pressure jet orifices insofar as the over-all jet propulsion of the cleaner as a whole is concerned. When the fitting is turned so that its water jet is directed forwards, a pre-flushing action within the sewer pipeline ahead of the cleaner is attained, while at the same time, due to the low velocity of the auxiliary water jet, the bucking action is slight and the forward velocity of the cleaner is not measurably decreased. The reduced pressure of the water jet issuing from the aforementioned elbow-like fitting is a result of the performance of useful work by the motor which carries at its forward end a rotary cutter, the auxiliary jet being established by the pressure of the water in the fluid outlet leading from the motor as aforesaid.

In addition to the features of novelty set forth in the Abstract Of The Disclosure, a further feature of the improved pipeline cleaner resides in the selection of an hydraulic motor which does not require the use of a metering or reduction orifice to prevent excessive motor speeds. Heretofore, in connection with pipeline cleaners for the same purpose as that of the present invention, it has been found that with turbine-driven motors or "fan-jet" type motors for driving the root cutter, the use of full-line pressure at the motor inlet leads to excessive motor speeds and consequent damage to the cutter, the motor bearings, and other rotary parts. Accordingly, it has been the practice to utilize a metering orifice to dampen the hydraulic motor, but the use of such an orifice has not proven altogether satisfactory inasmuch as low motor-impelling pressure results in a low torque factor. The present invention obviates this problem of motor dampening with consequent loss of torque and produces high cutter torque at safe motor speeds, a judicious selection of a motor being made to accomplish this aim. It has been found that the excessive speed problems which are associated with vane and "fan-jet" type hydraulic motors do not present themselves when a gerotor type motor is employed. Gerotors are widely used today throughout industry and are produced in a variety of shapes and sizes by various manufacturers. A gerotor motor or pump basically consists of two elements, namely, an inner gear-type driving rotor and a meshing outer gear-type driven rotor, the former having one less tooth than the latter. The principal developer of gerotors is the W. H. Nichols Company of Waltham, Mass. Another manufacturer of such hydraulic pumps is the Gulf Research and Development Co. of Pittsburgh, Pennsylvania. The last-mentioned company markets and sells a pump which is known as the "Pigott" pump and utilizes the gerotor principle. According to the present invention, it has been found that by utilizing a gerotor pump as a motor instead of as a pump, i.e., by supplying high pressure fluid to what ordinarily constitutes the gerotor pump outlet, the inner rotor will be driven at a constant velocity with high torque at any inlet pressure and, therefore, when such a motor is used in connection with the present pipeline cleaner, no problem of excessive motor and cutter speed is encountered.

Although the present invention utilizes an hydraulic motor which is well-known in the prior art, the adaptation of such a motor to the aims of the invention accomplishes improved results in connection with a pipeline cleaner, as will become apparent as the nature of the invention is better understood.

Another feature or object of the present invention is the provision of an improved sewer pipeline cleaner which is provided with a novel and highly efficient cage-like skid assembly which surrounds the composite casing and is fixedly connected thereto by a split clamping collar.

A further object of the invention is the provision of a sewer pipeline cleaner which is generally of new and improved design and is characterized by a novel and compact arrangement of parts.

Other objects of the invention and the various advantages and characteristics of the present sewer pipeline cleaner will be apparent from a consideration of the following detailed description.

The invention consists in the several novel features which are hereinafter set forth and are more particularly defined by the claims at the conclusion hereof.

In the accompanying single sheet of drawings, one illustrative embodiment of the invention is illustrated. In these drawings:

FIG. 1 is a side elevational view, partly in longitudinal section, illustrating a sewer pipeline cleaner embodying the principles of the present invention, and showing a flexible water supply hose operatively attached thereto;

FIG. 2 is a front end view of the pipeline cleaner of FIG. 1;

FIG. 3 is a rear end view of the pipeline cleaner;

FIG. 4 is a bottom plan view of the pipeline cleaner; and

FIG. 5 is a composite schematic view illustrating the principle of operation of an inner and an outer Gerotor arrangement which is associated with and forms a part of the hydraulic motor of the improved sewer pipeline cleaner and is employed in connection with the present invention.

Referring now to the drawings in detail and in particular to FIGS. 1 to 4, inclusive, the sewer pipeline cleaner of the present invention involves in its general organization a composite casing including a front motor section which is designated by the bracket 10, and, in addition, a rear jet thruster section 12. The front motor section of the composite casing is itself of a composite nature as will be described presently, and it is a purchased unit to which slight modifications have been made in order to adapt it to its intended use in connection with the present invention. Said front motor section 10 constitutes the casing of a complete hydraulic motor M, the latter being provided with a forwardly projecting cutter drive shaft 14 which is adapted to receive thereon an assortment of attachments such as the spiral saw blade root cutter 16 of FIG. 1 or any of a large variety of conventional pipeline cleaning heads. The root cutter 16 is provided on its central portion with an adapter collar 18 which is telescopically received over the drive shaft 14 and is fixedly connected thereto by a ply 20. Lock screws 22 serve to hold the key 20 in position against dislodgment.

The front and rear casing sections 10 and 12 are surrounded by a cage-like skid assembly 24 consisting of three generally longitudinally extending runners 26 which are equally disposed or spaced circumferentially about the composite casing and embody inwardly slanting end portions 28 to facilitate passage of the cleaner in either direction along a sewer pipeline. The runners 26 are formed of heavy gauge rigid rod stock and are maintained in their circumferentially spaced relationship by means of radial struts 30 which have their outer portions welded to the runners in the medial regions thereof and their inner portions welded to a split clamp collar 32. The latter has outwardly turned ends 34 through which there extends a clamping nut and bolt assembly 36, the latter serving, when tightened, to shrink the collar upon the front motor section 10 of the composite casing.

The casing sections 10 and 12 are generally of cylindrical configuration which is to say that they are of circular cross section throughout except for the provision of a raised flat land area 40 and a square bolting flange 41 which are provided on the front motor section 10. This land area is tapped to provide a motor inlet 42 (see FIG. 4) and a motor outlet 44. An elbow fitting 46 is threadedly received in the motor inlet 42; and an elbow jet nozzle 48 is threadedly received in the motor outlet 44 and performs a function that will be made clear presently.

The rear thruster section 12 of the composite casing is provided with a circular forward attachment flange 50 (see FIG. 1) which is secured to the rear end of the front motor section 10 by an annular series of circumferentially spaced clamping bolts 52. The forward end face of the jet thruster casing section is recessed as indicated at 54 and receives therein a pilot boss 55 which is formed on the rear end face of the front motor section 10 of the casing. The medial region of the rear jet thruster section is formed with a rearwardly flaring frusto-conical portion 56 which affords a clearance region for installation or removal of the clamping bolts 52. The rear end of the rear jet thruster section 12 of the composite casing has formed therein a relatively deep, axially disposed socket 58 which establishes a pressure chamber 60 for motive fluid (water under pressure) as will be described presently. The rear end of the socket 58 is adapted threadedly to receive therein one end of a coupler fitting 62 which is associated with the discharge end of a flexible water supply hose (not shown). A series of outwardly and rearwardly inclined jet passages 64 project through the wall of the socket 58 in the rear jet thruster section 12 of the casing and are adapted to direct a series of water jets rearwardly and outwardly into the sewer pipeline to impel the cleaner forwardly when the same is in operation.

The pressure chamber 60 is provided with a laterally extending fluid outlet 70 which threadedly receives therein an elbow fitting 72, the latter being operatively connected to the elbow fitting 46 by means of a length of tubing 74 which establishes a fluid line between the socket 58 and the motor inlet 42. From the above description, it will be apparent that when water under pressure is supplied to the pressure chamber 60 from the aforementioned flexible supply hose, substantially full-line water pressure will be supplied to the jet passages 64 while similar water pressure will be conducted to the hydraulic motor M to actuate the same and effect rotation of the cutter 16, there being but little water pressure reduction in the chamber 60 arising from the bleeding thereof to the motor M.

As previously stated, the motor M, including the front motor section 10, is a purchased item which constitutes a basic element of the present pipeline cleaner, the addition thereto of the rear jet thruster section 12, the skid assembly 24, the root cutter 16, the tubing 74, and the elbow jet nozzle 48 being all that is necessary to complete the pipeline cleaner. The particular selected motor for use in connection with the present invention delivers adequate torque throughout a large range of inlet pressures, and at full-line pressure, which is on the order of 1,000 psi, acceptable output speeds for proper functioning of the pipeline cleaner are not exceeded so that metering valves or orifices are not needed.

The motor M is of the gerotor type, such motors being known for many years and being still widely used in industry. One such motor which has been found admirably adapted for use in connection with the present invention is manufactured and sold by Char-Lynn Company of Eden Prairie, Minn. under the name "CHAR-LYNN," such motor bearing the designation of Model (AC). The principle of operation of the "CHAR-LYNN" gerotor type motor is fully described in a publication of W. H. Nichols Company of Waltham, Mass., the publication being designated as Publication 69 and entitled "Gerotor Standards Including Stock Gerotors." No claim is made herein to any novelty in the motor M and a full disclosure of the internal gerotor gearing which is associated with the same has not been made. The principle of operation of the motor M has, however, been schematically disclosed in FIG. 5.

Briefly, the front motor section 10 of the composite casing is comprised of a number of coaxial ring-shaped sections including a main casing section 80 on which the aforementioned flat land area 40 is formed and which is provided with a reduced portion 82 establishing a rearwardly facing shoulder 84 against which the front end surface of the split clamping ring 32 bears; a forward porting section 86; a medial gerotor gearing section 88; and a rear closure plate 90. The only modification which has been made to the original gerotor motor M, as purchased, is to remove the original clamping bolts and substitute therefor the clamping bolts 52 which are of adequate length to accommodate the attachment of the bolting flange 50 of the rear jet thruster section 12 to the front motor section 10.

The principle of operation of the gerotor gearing section 88 is schematically illustrated in FIG. 5 wherein the details of a five-to-four tooth gerotor motor is shown. In all gerotors, there is an outer "gear" and an inner "gear," the inner gear always having one less tooth than the outer gear. In FIG. 5, the outer gear (which comprises the gearing section 88) is provided with five internal "teeth" while the inner gear 88a is provided with four external "teeth." The outer gear is fixed since it constitutes an element of the front composite motor section 10 of the casing, while the inner gear 88a is rotatable. The volume of the "mising tooth" multiplied by the number of driver teeth determines the volume of fluid displaced at each revolution of the inner tooth 88a. As the inner gear 88a rotates in the direction indicated by the arrows in FIG. 5, the chamber between the teeth of the inner and outer gears gradually increases in size through approximately 180° of each revolution until it reaches the maximum size which is equivalent to the full volume of the "missing tooth." During this initial half of the cycle, the gradually enlarging chamber is exposed to the inlet port 42a (which communicates through the porting section 86 with the motor inlet 42). During the subsequent 180° of the revolution, the chamber gradually decreases in size as the teeth mesh and the fluid passes outwardly through the discharge port 44a (which communicates through the porting section 86 with the motor outlet 44). Such passage of the fluid through the gerotor gearing exerts a generally tangential torque on the inner gear 88a which is connected by a central shaft 14a to the motor output shaft 14.

In the operation of the herein described pipeline cleaner, the assembled cleaner is attached to the discharge end of a high pressure hose as previously described and then the cleaner is placed in the sewer or other pipeline to be cleaned, it being understood, of course, that the appropriate tool is attached to the motor output shaft 14. As soon as the water valve of the water supply source is opened, the rear jet thruster section of the composite casing will propel the cleaner forwardly while the motor M is simultaneously actuated to rotate the root cutter 16 or other tool which may be attached to the output shaft 14. Obstructions in the pipeline will be disintegrated by the rapidly rotating root cutter, while at the same time the saw teeth on the latter will scrape and descale the wall of the pipeline clear of accumulations. Propelling of the cleaner along the pipeline is, of course, effected by the jet action of the water issuing from the jet passages 64. This propelling action also is assisted by the reduced pressure jet of water issuing from the elbow jet nozzle 48 when the latter is positioned so that it extends rearwards.

It will be understood that the flexible water supply hose will be coiled on a reel which is associated with the pumping unit on he operating and maintenance truck or trailer so that in the event of an overload and consequent motor stall, together with stoppage of the forward motion of the cleaner, the reel may be operated to retract the cleaner a short distance and then release the same to allow it to regain its momentum. After the cleaner has passed completely through the pipeline any unflushed material remaining in the latter may be removed by pulling the cleaner rearwardly while allowing the motor M to operate, thereby completely flushing the pipeline.

With a dry pipeline or where there is likely to be encrusted material, it may be found desirable to turn the elbow jet nozzle 48 throughout an angle of 180° so that it directs is jet stream forwardly. Such reversal of the nozzle 48 will project a stream of water a considerable distance forwardly of the cleaner as it is propelled through the pipeline but it has little effect upon the total involved jet force inasmuch as the jet pressure which is produced by the nozzle 48 is appreciably less than the combined force of the jets issuing from the rearwardly directed jet passages 64 by reason of the pressure drop which is involved in the performance of work by the motor M.

The invention is not to be limited to the exact arrangement of parts shown in the accompanying drawings or described in this specification as various changes in the details of construction may be resorted to without departing from the spirit or scope of the invention.

I claim:

1. A hydraulic pipeline cleaner comprising, in combination, a hydraulic motor having cooperating gerotor gears and including a motor casing section having formed therein a motor inlet and a motor outlet, a jet thruster section secured to the rear end of said motor casing section and defining a blind socket adapted for attachment to and communication with the discharge end of a flexible high pressure fluid hose, there being a series of jet-producing passages in the wall of said blind socket for producing respective rearwardly directed fluid propulsion jets, an output shaft for said motor projecting forwardly of the motor casing section, a cleaning head mounted on said output shaft, a cage-like skid assembly encompassing said motor casing and jet thruster sections and including longitudinally extending anti-friction runners circumferentially spaced around the motor casing and jet thruster sections, and a fluid line exteriorly of the jet thruster sections and the motor casing section establishing communication between said blind socket and motor inlet.

2. A hydraulic pipeline cleaner as set forth in claim 1 and wherein said anti-friction runners are coextensive with the overall longitudinal extent of the motor casing and jet thruster sections, are supported in their circumferentially spaced relationship by means of a split clamping collar which is shrunk upon the motor casing section, and are individually mounted on radial struts which in turn are mounted on said collar.

3. A hydraulic pipeline cleaner as set forth in claim 1 and wherein said motor casing section is formed with a reduced section establishing a rearwardly facing shoulder against which said split clamping collar bears.

4. A hydraulic pipeline cleaner as set forth in claim 1 and wherein said fluid line is comprised of two elbow fittings, one of which is threadedly received in the jet thruster section and communicates with said blind socket, and the other of which is threadedly received in the motor casing section and communicates with said motor inlet, and a length of rigid tubing extending between said elbow fittings.

5. A hydraulic pipeline cleaner as set forth in claim 4 and including additionally an elbow fitting threadedly received in said motor casing section and in communication with said motor outlet, said latter elbow fitting establishing an auxiliary jet-producing nozzle, said latter elbow fitting being capable of turning movement throughout an angle of 180° whereby the jet produced by said nozzle may selectively be directed rearwardly to augment the jet propulsion thrust of the jets issuing from said jet-producing passages, or forwardly to project a stream of fluid forwardly of the motor casing section for flushing purposes.

6. A hydraulic pipeline cleaner as set forth in claim 5 and wherein the forward end region of said jet thruster section is provided with a radial bolting flange, the jet thruster section is secured to the motor casing by a series of clamping bolts which project through said bolting flange, and the jet thruster section is formed with a frusto-conical medial region presenting its small base forwardly whereby access to said clamping bolts is facilitated.

7. A hydraulic pipeline cleaner comprising, in combination, a hydraulic motor having cooperating gerotor gears to provide high torque at relatively low speeds and including a motor casing having formed therein a motor inlet and a motor outlet, a jet thruster section secured to the rear end of said motor casing section and defining a socket adapted for attachment to and communication with the discharge end of a flexible high pressure fluid hose, there being a series of jet-producing passages in the wall of said socket for producing respective rearwardly directed fluid propulsion jets, an output shaft for said motor projecting forwardly of the motor casing section, a cleaning head mounted on said output shaft, a skid assembly encompassing said motor casing and jet thruster sections and including longitudinally extending anti-friction elements circumferentially spaced around the motor casing and jet thruster sections, and a non-restricted fluid line establishing communication between said socket and motor inlet to deliver full pressure fluid to said hydraulic motor.

8. The hydraulic pipeline cleaner of claim 7 further including an elbow fitting threadedly received in said motor casing section and in communication with said motor outlet, said elbow fitting establishing an auxiliary jet-producing nozzle and being capable of turning movement through an angle of 180° whereby the jet produced by said auxiliary nozzle may be selectively directed rearwardly to augment the jet propulsion thrust of the jets issuing from said jet-producing passages, or forwardly to project a steam of fluid forwardly of the motor casing section for flushing purposes.

9. A hydraulic motor according to claim 8 wherein said fluid line is located exteriorly of the jet thruster sections and the motor casing section.

* * * * *